(12) United States Patent
Wüllrich

(10) Patent No.: US 9,873,313 B2
(45) Date of Patent: Jan. 23, 2018

(54) TOP HAVING ROOF FRAME ELEMENTS BEING DISPLACEABLE WITH RESPECT TO ONE ANOTHER

(71) Applicant: Webasto-Edscha Cabrio GmbH, Stockdorf (DE)

(72) Inventor: Heinrich Wüllrich, Stockforf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/921,108

(22) Filed: Oct. 23, 2015

(65) Prior Publication Data

US 2016/0121703 A1    May 5, 2016

(30) Foreign Application Priority Data

Nov. 4, 2014   (DE) .......................... 10 2014 116 063

(51) Int. Cl.
*B60J 7/12*    (2006.01)

(52) U.S. Cl.
CPC .................... *B60J 7/1265* (2013.01)

(58) Field of Classification Search
CPC . B60J 7/12; B60J 7/1239; B60J 7/1265; B60J 7/14; B60J 7/143; B60J 7/146
See application file for complete search history.

(56) References Cited

U.S. PATENT DOCUMENTS

| | | | | |
|---|---|---|---|---|
| 1,533,148 A | * | 4/1925 | Tomkins | B60J 7/1265 296/116 |
| 6,425,622 B2 | * | 7/2002 | Eberle | B60J 7/145 296/107.16 |
| 6,796,595 B2 | * | 9/2004 | Doncov | B60J 7/1265 296/107.09 |
| 6,857,687 B2 | * | 2/2005 | Bruder | B60J 7/146 296/108 |
| 6,913,306 B2 | * | 7/2005 | Rosler | B60J 7/146 296/107.17 |
| 7,331,624 B2 | * | 2/2008 | Obendiek | B60J 7/146 296/107.01 |

(Continued)

FOREIGN PATENT DOCUMENTS

| | | | | |
|---|---|---|---|---|
| DE | 29713522 U1 | * | 10/1997 | ............ B60J 7/1265 |
| DE | 10062077 A1 | * | 6/2002 | ............ B60J 7/146 |

(Continued)

*Primary Examiner* — Glenn Dayoan
*Assistant Examiner* — Paul Chenevert
(74) *Attorney, Agent, or Firm* — Fitch, Even, Tabin & Flannery, LLP

(57) ABSTRACT

A top for a convertible vehicle having a linkage, which is displaceable between a closed and storage position and which, in relation to a vertical longitudinal center plane of the top on both sides, includes a link arrangement, having a first roof frame element being disposed in the front and a second roof frame element being arranged, in the closed position, toward the rear with respect to the front roof frame element, wherein the two roof frame elements are connected to each other via first and second control links of a four-arm hinge arrangement and can be displaced with respect to each other using a coupling rod, which is linked to a main link of a main four-arm hinge mechanism, the second roof frame element being linked to said mechanism.

4 Claims, 3 Drawing Sheets

(56) References Cited

U.S. PATENT DOCUMENTS

| | | | |
|---|---|---|---|
| 7,607,715 B2 * | 10/2009 | Beierl | B60J 7/1265 296/107.15 |
| 7,726,721 B2 * | 6/2010 | Froschle | B60J 7/1265 296/107.01 |
| 7,766,413 B2 * | 8/2010 | Dietl | B60J 7/1265 296/107.09 |
| 7,950,718 B2 * | 5/2011 | Neubrand | B60J 7/20 296/107.07 |
| 8,025,328 B2 * | 9/2011 | Dilluvio | B60J 7/1265 296/109 |
| 8,118,343 B2 * | 2/2012 | Beierl | B60J 7/1265 296/107.09 |
| 8,764,095 B2 * | 7/2014 | Ritzinger | B60J 1/1815 296/107.07 |
| 8,899,657 B2 | 12/2014 | Braun et al. | |
| 2007/0057531 A1 * | 3/2007 | Hesse | B60J 7/146 296/107.17 |
| 2016/0167497 A1 * | 6/2016 | Froeschle | B60J 7/1265 296/107.08 |
| 2017/0015181 A1 * | 1/2017 | Wullrich | B60J 7/146 |
| 2017/0259653 A1 * | 9/2017 | Wullrich | B60J 7/146 |

FOREIGN PATENT DOCUMENTS

| | | | |
|---|---|---|---|
| DE | 10160414 C1 * | 7/2003 | B60J 7/202 |
| DE | 10205935 A1 * | 8/2003 | B60J 7/1226 |
| DE | 102 10 616 B4 | 2/2004 | |
| DE | 102004050694 A1 * | 3/2006 | B60J 7/146 |
| DE | 102009037605 A1 * | 2/2011 | B60J 7/1265 |
| DE | 10 2011 117 371 A1 | 5/2013 | |
| DE | 10 2011 056 730 A1 | 6/2013 | |
| DE | 102012025397 A1 * | 6/2014 | B60J 7/1204 |
| DE | 102015102796 A1 * | 9/2016 | B60J 7/1265 |
| DE | 102015106311 A1 * | 10/2016 | B60J 7/1265 |
| EP | 1228913 A2 * | 8/2002 | B60J 7/1823 |
| FR | 595226 A * | 9/1925 | B60J 7/1265 |
| FR | 2982199 A1 * | 5/2013 | B60J 7/1204 |
| WO | WO 2008011880 A1 * | 1/2008 | B60J 1/1823 |
| WO | WO 2008064695 A1 * | 6/2008 | B60J 7/143 |
| WO | WO 2010105037 A1 * | 9/2010 | B60J 7/1265 |

* cited by examiner

TOP HAVING ROOF FRAME ELEMENTS BEING DISPLACEABLE WITH RESPECT TO ONE ANOTHER

CROSS-REFERENCE TO RELATED APPLICATIONS

This application claims priority from German Patent Application Number DE 10 2014 116 063.0, filed Nov. 4, 2014, which is hereby incorporated herein by reference in its entirety.

FIELD

The invention relates to a top for a convertible vehicle.

BACKGROUND

Such a top is known from document DE 102 10 616 B4 and comprises a linkage, which comprises, for displacing a top cloth, a linkage, which is displaceable between a closed position for spanning a vehicle interior and a storage position for clearing the vehicle interior to the top. The linkage, in relation to a vertical longitudinal center plane of the top on both sides, includes a link arrangement, which comprises a main four-arm hinge mechanism being mounted, so as to be pivotable, at a main bearing that is fixed relative to the vehicle, said main four-arm hinge mechanism being formed from two main links, one of which constitutes a so-called main pillar. In each instance, via a pivot, a roof frame element is articulated to the two main links. Another roof frame element is linked to said roof frame element via another four-arm hinge arrangement, which includes two control links, the other roof frame element being arranged at the front in the closed position of the linkage and being adjacent to a front apron of the relevant vehicle. For displacing or pivoting the front roof frame element as against the roof frame element being linked to the main four-arm hinge mechanism, the link arrangement includes a coupling rod, which, on the one hand, is linked to one of the main links, and is linked, on the other hand, via an elongated hole, to one of the control links and, via a slot lever, to the rear roof frame element. Linking links via elongated holes and slot guides is at the expense of the stiffness of the system.

SUMMARY

It is the object of the invention to create a top of the kind referred to in the introduction, which is able to have a higher stiffness than the state of the art having been described above and which does not have any degrees of freedom that might destabilize the system.

Thus, the essence of the invention is linking the coupling rod, which is used for displacing one of the roof frame elements as against the other roof frame element, to both of the control links, in each instance via a control lever, to be more precise in each instance via fixed pivots. Consequently, if the two control links are viewed as a fixed unit, an additional four-arm hinge arrangement is placed onto the two control links, one basis of the four-arm hinge arrangement being formed by the control links and the other basis of said arrangement being formed by the coupling rod. Both control links are driven. By correspondingly designing the control links and the coupling links and correspondingly arranging the hinge points, relating to a front apron of the relevant vehicle, when the top is being closed, that means when the linkage is being brought into the closed position, a flat infeed curve can be achieved for the front roof frame element. Additionally, the coupling links and the linking thereof to the control links and to the coupling rod may be realized with a small installation space requirement in the transverse direction of the top.

The term "roof frame element", in the present case, is to be interpreted in the broadest sense. For example, the roof frame element is a simple link, which extends parallel to the longitudinal center plane of the top and at which sealing elements may be arranged. The roof frame element may also be a lateral edge region of a rigid top element, which extends in the transverse direction of the vehicle and is, for example, a roof tip, which is part of a folding top and which, in the closed position thereof, abuts against a front apron of the relevant vehicle with its front edge. The roof frame element may also be part of a lateral edge region of a rigid roof segment, which is associated with a foldaway roof or RHT (Retractable Hard Top) being constructed from rigid roof elements.

In a special embodiment of the top according to the invention, the link arrangements being arranged on both sides are designed such that the first control link is articulated to a front end of the second roof frame element and the second control link is centrally articulated, between the front end and the main four-arm hinge mechanism, to the second roof frame element. Correspondingly, the coupling links are then preferably articulated to the front end of the coupling rod and centrally articulated, between said front end and the main four-arm hinge mechanism, to the coupling rod.

Further advantages and advantageous configurations of the subject-matter of the invention can be taken from the description, from the drawing and from the claims.

BRIEF DESCRIPTION OF THE DRAWINGS

In the drawing, an exemplary embodiment of a top according to the invention is illustrated in a schematically simplified way and will be explained in more detail in the following description. In the figures.

DETAILED DESCRIPTION

Figure 1:
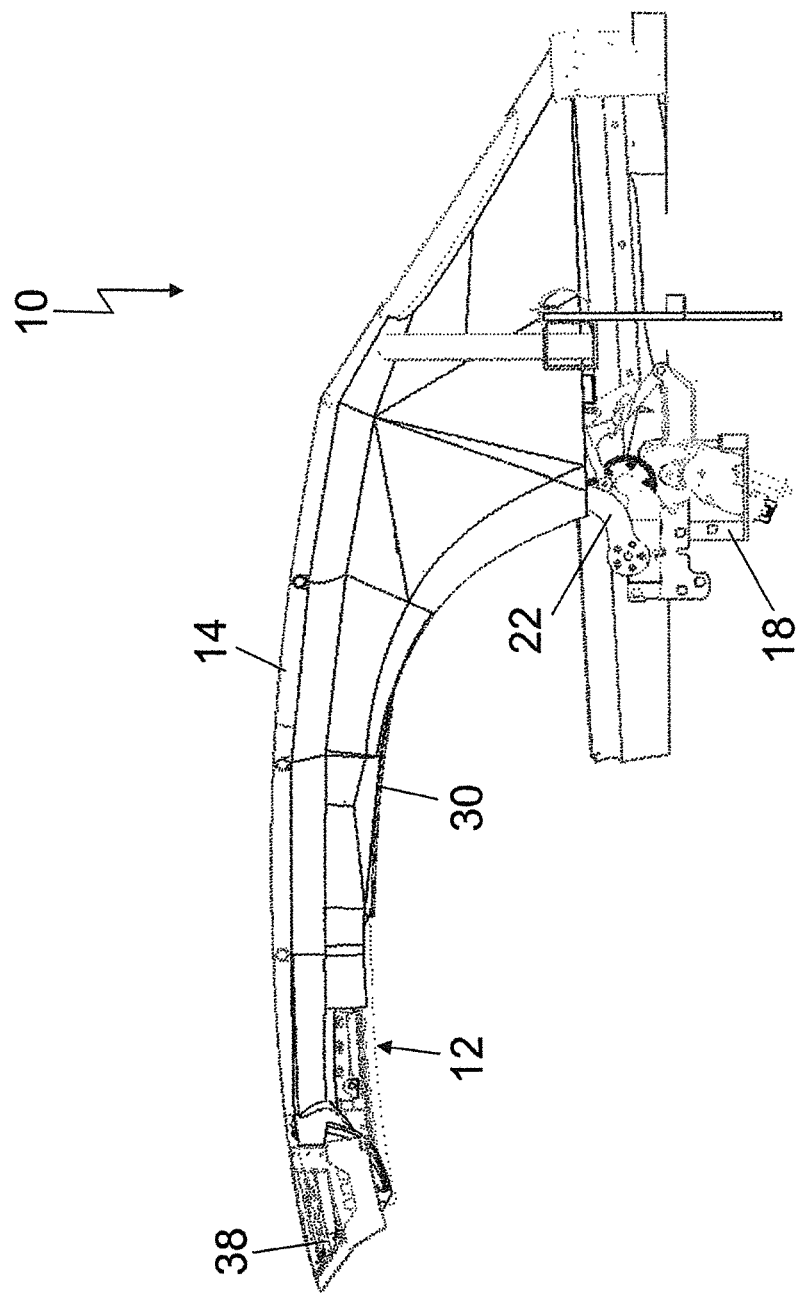
FIG. 1 shows a side view of a folding top being realized in accordance with the invention.
Figure 2:
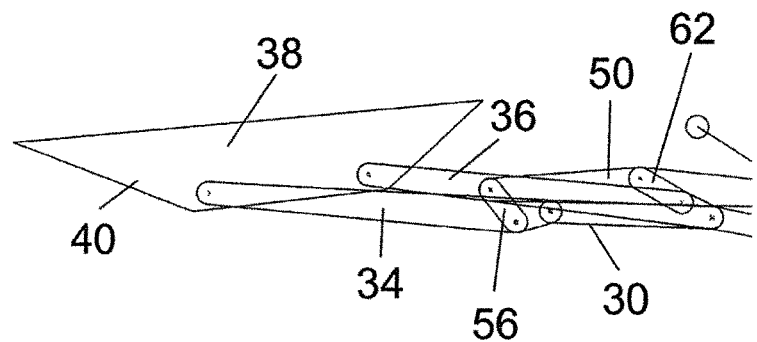
FIG. 2 shows a strongly schematized side view in sections of a linkage of the folding top in the closed position thereof.
Figure 4:
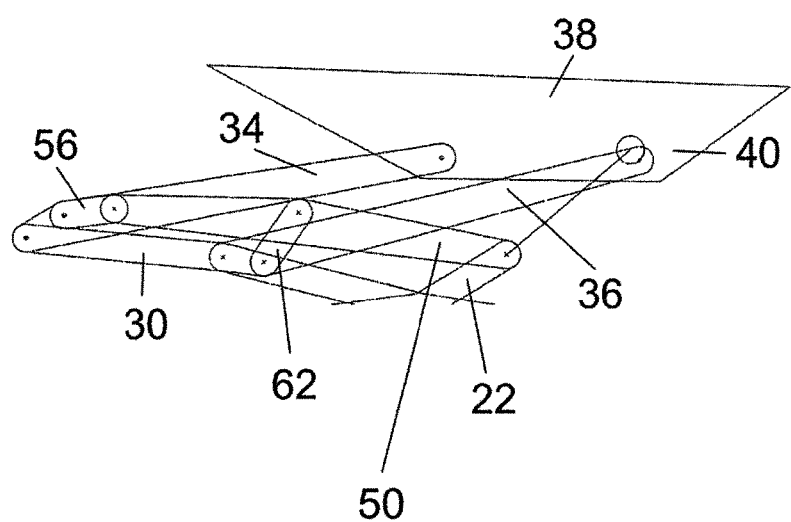
FIG. 4 equally shows a view of the linkage corresponding to FIG. 2, but in a storage position.

FIG. 1 shows a folding top 10 of a motor vehicle not being illustrated in more detail otherwise and being realized as a convertible vehicle. The folding top 10 can be displaced as desired between a closed position which is illustrated in FIG. 1, and in which a vehicle interior of the relevant motor vehicle is spanned, and a storage position, which is illustrated regarding a portion that is relevant for the present invention in FIG. 4 and in which the top is accommodated in a top storage compartment being arranged toward the rear with respect to the vehicle interior.

For being displaced, the folding top 10 includes a linkage 12, which serves to span a top cloth 14, which is formed from a foldable textile material. The linkage 12, in relation to a vertical longitudinal center plane of the top on each of its two sides, includes a link arrangement 16, which is mounted at a main bearing 18 so as to be pivotable, said main bearing being arranged in the region of the top storage compartment of the relevant vehicle.

In the drawing, for reasons of clarity, only the link arrangement 16 being arranged on the left in relation to the forward direction of travel of the relevant vehicle is illustrated. The link arrangement being arranged on the right is realized as a mirror image of said link arrangement 16 and thus equally follows inevitably from the below description.

The link arrangements 16 being arranged on both sides in each instance include a main four-arm hinge mechanism 20, which includes two main links 22 and 24, the main link being arranged in the front in the closed position of the folding top 10 being designated as main pillar.

The main four-arm hinge mechanism 20, which comprises the two main links 22 and 24, is connected, via a pivot 26 being realized at the main link 24 and a pivot 28 being realized at the main link 22, to a roof frame element 30 constituting a roof link, which may in this way be considered to be part of the main four-arm hinge mechanism.

The roof frame element 30, which forms a middle roof frame element in the closed position of the folding top 10, is in turn connected, via a four-arm hinge arrangement 32, which comprises two control links 34 and 36, to a roof tip 38 forming a rigid top element and extending in the transverse direction of the top. Hereunto, the roof tip 38, in relation to the vertical longitudinal center plane of the top on each of its two sides, includes a lateral edge region, which forms a front roof frame element 40, the control links 34 and 36 being articulated thereto via pivots 42 and 44. The control links 34 and 36 are articulated to the roof frame element 30 via pivots 46 and 48. In the closed position of the folding top 10, the front roof frame element 40 is arranged toward the front with respect to the middle roof frame element 30, the main link 22 forming a rear roof frame element adjoining said middle roof frame element in the rear.

In order to be able to displace or pivot the roof tip 38 as against the roof frame element 40, each of the link arrangements 16 includes a coupling rod 50, which is articulated, with its rear end, via a pivot 52, to the main link 22 of the main four-arm hinge mechanism 20, said link constituting the main pillar. At its front end, the coupling rod 50, via a pivot 54, is connected to a coupling link 56, which is in turn linked to the control link 34 via a pivot 58, that means to the front control link from amongst the two control links 34 and 36. In a middle portion being arranged between the two pivots 52 and 54, another pivot 60 is realized at the coupling rod 50, via which pivot a second coupling link 62 is articulated, which is articulated to the control link 36 for the roof tip 38 via another pivot 64. All pivots are realized as fixed pivots between the relevant links.

Figure 3:
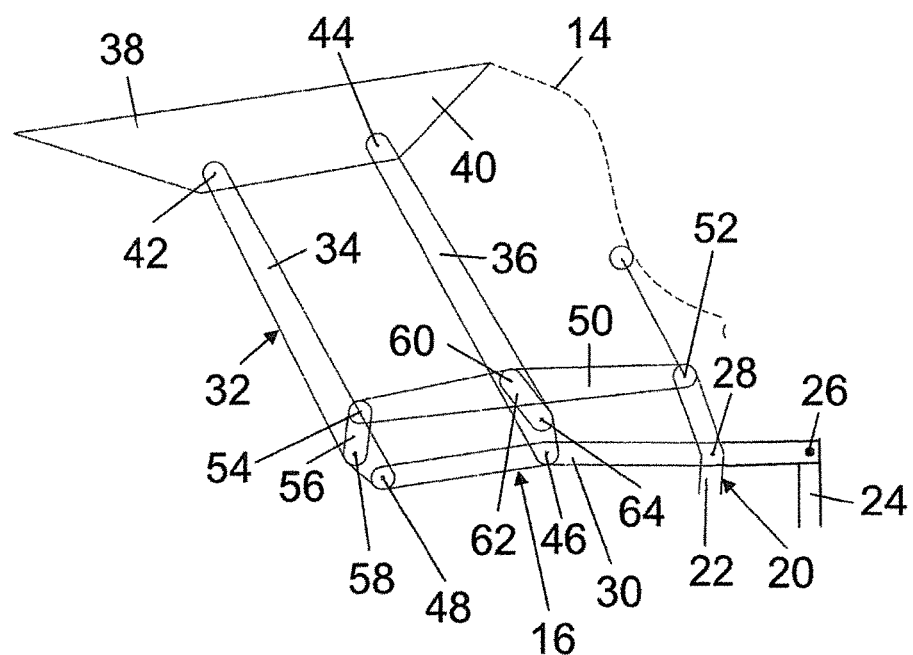
FIG. 3 shows a view of the linkage corresponding to FIG. 2, but in an intermediate position.

When the folding top 10 is being displaced from the closed position being illustrated in FIG. 1 into the storage position, the main four-arm hinge mechanism 20 is pivoted to the rear, that means, with the orientation having been selected in the drawing, clockwise. Hereby, a displacing moment is introduced, by the main link 22 via the coupling rod 50 and the coupling links 56 and 62, into the control links 34 and 36, such that the same, together with the roof tip 38 or the roof frame element 40 being associated with the roof tip 38, are pivoted as against the roof frame element 30 via the intermediate position being illustrated in FIG. 3 into the storage position being illustrated in FIG. 4. In the storage position, the two roof frame elements 30 and 40 are at least nearly arranged one atop the other, requiring only a small installation space.

LIST OF REFERENCE NUMERALS 10 folding top
12 linkage
14 top cloth
16 link arrangement
18 main bearing
20 main four-arm hinge mechanism
22 main link
24 main link
26 pivot
28 pivot
30 roof frame element
32 four-arm hinge arrangement
34 control link
36 control link
38 roof tip
40 roof frame element
42 pivot
44 pivot
46 pivot
48 pivot
50 coupling rod
52 pivot
54 pivot
56 coupling link
58 pivot
60 pivot
62 coupling link
64 pivot

The invention claimed is:

1. A top for a convertible vehicle, comprising:
a linkage, which is displaceable between a closed position for spanning a vehicle interior and a storage position for clearing the vehicle interior to the top and which, in relation to a vertical longitudinal center plane of the top on both sides, which includes a link arrangement,
the link arrangement having a first roof frame element being disposed in the front and a second roof frame element being arranged, in the closed position, toward the rear with respect to the front roof frame element,
wherein the first roof frame element and the second roof frame element are connected to each other via a first control link and a second control link of a four-arm hinge arrangement and can be displaced with respect to each other using a coupling rod, which is linked to a main link of a main four-arm hinge mechanism, the second roof frame element being linked to said mechanism,
wherein the first control link and the second control link are linked to the second roof frame element via a first pivot and a second pivot, and
the coupling rod is linked to a first coupling link, which is connected to the first control link via a third pivot offset to the first pivot, and to a second coupling link, which is articulated to the second control link via a fourth pivot offset to the second pivot.

2. The top according to claim 1, wherein, in each instance in relation to the closed position of the linkage, the first control link is articulated to a front end of the second roof frame element and the second control link is centrally articulated, between the front end and the main four-arm hinge mechanism, to the second roof frame element.

3. The top according to claim 1, wherein the first roof frame element forms a lateral edge region of a roof tip of a folding top.

4. The top according to claim 1, wherein the first roof frame element forms a lateral edge region of a rigid roof segment of a foldaway roof.

* * * * *